United States Patent [19]

Muto

[11] 4,172,504
[45] Oct. 30, 1979

[54] BICYCLE ENGINE

[75] Inventor: Goro Muto, Funabashi, Japan

[73] Assignee: Tanaka Kogyo Kabushiki Kaisha, Narashino, Japan

[21] Appl. No.: 897,514

[22] Filed: Apr. 18, 1978

[30] Foreign Application Priority Data

Apr. 19, 1977 [JP] Japan .................. 52-48564[U]

[51] Int. Cl.² .......................................... B62K 11/12
[52] U.S. Cl. ............................. 180/221; 192/48.92; 192/103 B
[58] Field of Search ............. 180/33 D, 74; 192/48.5, 192/48.92, 103 B, 105 CD

[56] References Cited

U.S. PATENT DOCUMENTS

| 3,173,528 | 3/1965 | Mennesson | 192/103 B |
| 3,393,781 | 7/1968 | Miura | 192/105 CD X |
| 4,014,402 | 3/1977 | Muto | 180/33 D |

FOREIGN PATENT DOCUMENTS

| 94253 | 6/1957 | Denmark | 180/33 D |
| 1153033 | 2/1958 | France | 180/33 D |
| 730367 | 5/1955 | United Kingdom | 192/105 CD |

OTHER PUBLICATIONS

"Machine Design," Apr. 14, 1960, vol. 32, No. 8, p. 174.

Primary Examiner—Trygve M. Blix
Assistant Examiner—Terrance L. Siemens
Attorney, Agent, or Firm—Frishauf, Holtz, Goodman and Woodward

[57] ABSTRACT

A bicycle engine provided with a transmission roller on the end of a forwardly extending driving shaft for contacting the front wheel tire is attached to the front of the handle bar via an engine frame attached to the front wheel fork. A clutch provided between the engine and the driving wheel starts the engine by transmitting the rotation of the wheel caused by pedaling and also prevents the transmission of engine rotation when the engine is kept idle.

12 Claims, 10 Drawing Figures

BICYCLE ENGINE

BACKGROUND OF THE INVENTION

The present invention relates to a bicycle engine and more particularly to a bicycle engine having a transmission roller at the end of the engine driving shaft which is contacted with or moved away from the bicycle tire by selectively inclining the engine.

The bicycle engine in accordance with applicant's prior U.S. Pat. No. 4,014,402 has no special starting device for the engine itself. Therefore, the engine is started by inclining the engine frame by means of a lever, thereby causing the transmission roller provided at the end of the driving shaft to contact the tire and by pedaling the bicycle to rotate the wheels. Thus, the rotation of the wheels is transmitted to the engine via the transmission roller. When one wants to stop temporarily for example at an intersection, it is necessary to operate the lever to turn the engine frame upward and move the transmission roller away from the tire in order to cut off the transmission of engine rotation to the wheel.

Such an operation is about the same as operating a clutch, but in the case of this prior engine, the engine itself had to be inclined to acheive the same effect as the clutch. Operating the lever was more burdensome compared to an ordinary clutch. It is, therefore, desirable for safety purposes to eliminate this motion of inclining the engine once the engine is started. This can be achieved simply by providing a clutch on the driving shaft, except that an ordinary clutch requires a separate lever to connect or disconnect the clutch and further complicates the operation of the bicycle. A centrifugal clutch which utilizes the engine rotation is a conceivable solution, and yet such a clutch may be useful for stopping the bicycle temporarily while keeping the engine "on", but cannot transmit the wheel rotation to the engine as the operator steps on the pedals. Thus, this type of clutch requires a separate engine starting device and complicates the whole mechanism.

In view of such difficulties, the object of this invention is to provide a clutch mechanism which can start the engine by transmitting the wheel rotation started as the operator steps on the pedals since the transmission roller is kept in contact with the wheel tire, and which also can prevent transmission of the engine rotation to the transmission roller once the engine has been started and it is being kept in its idle condition.

SUMMARY OF INVENTION

In accordance with the present invention, a bicycle engine comprising a forwardly extending drive shaft and transmission roller provided at the end of the said driving shaft to contact the front wheel tire is mounted to the front of the handlebars by the engine frame attached to the front wheel fork, and has a clutch mechanism between the driving wheel and the engine which starts the engine by the revolving wheel via the clutch shoes as the claw arms provided on the clutch shoes engage with openings on the clutch drum, and allows the idle rotation when the engine is running at a low speed and the claw arms revolve as they slide inside the clutch drum.

DETAILED DESCRIPTION OF THE DRAWINGS

Figure 1:
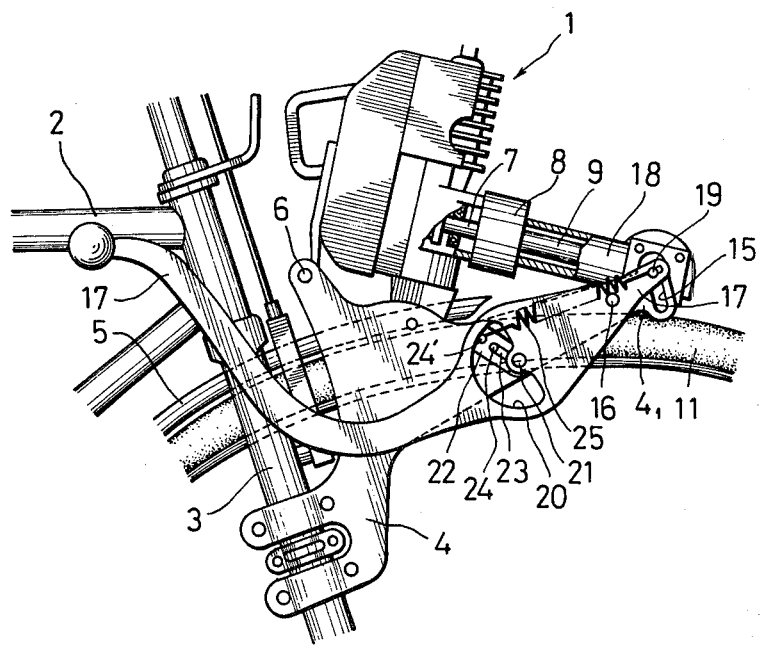
FIG. 1 is a side view of a bicycle engine provided with a centrifugal clutch mechanism in accordance with the present invention.
Figure 2:
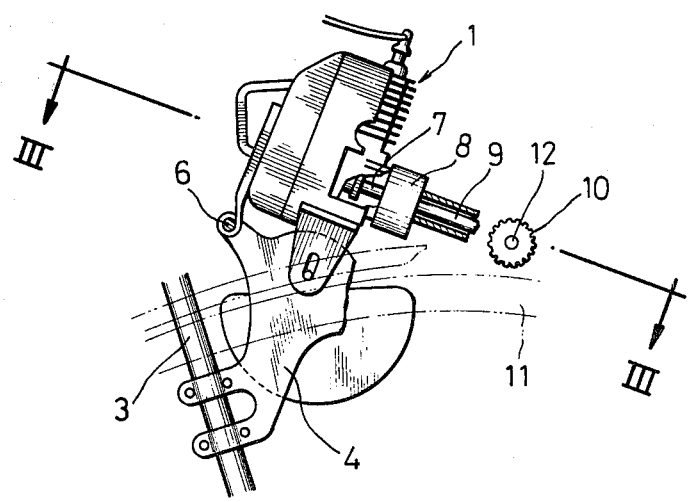
FIG. 2 is a fragmentary side view of the engine frame shown in FIG. 1.
Figure 3:
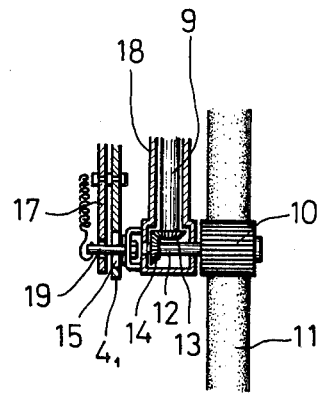
FIG. 3 is a partial cross sectional view along the line III—III in FIG. 2.

In FIG. 1 the engine 1 is pivotally mounted to the bicycle via the support point of the engine frame 4 fixed to the front wheel fork 3 of the bicycle frame 2. The engine is above the front wheel fender 5. The engine 1 has a centrifugal clutch 8 at one end of the crank shaft 7 from which a driving shaft 8 extends forwardly. At the tip of the driving shaft 9 is provided a transmission roller 10 which contacts the front wheel tire 11 as shown in FIGS. 2 and 3. The engine rotation is transmitted to the transmission roller 10 by means of bevel gears 13,14 which are connected to support shaft 12 and driving shaft 9, respectively.

A part of the engine frame 4 extends like an arm close to the side of the transmission roller 10. This arm 4₁ has a longitudinal orifice 15 at its end and the engine inclining lever 17 is pivottaly attached thereto by shaft 16.

Figure 4:
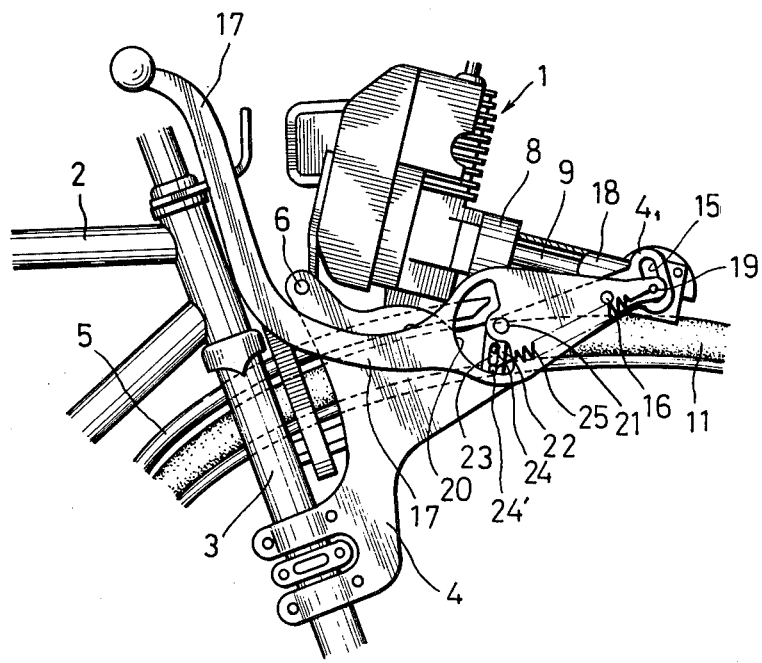
FIG. 4 is a side view showing the transmission roller in contact with a tire.

On the transmission roller side of arm 4, is provided a shaft 19 at the end of the sleeve 18 of the driving shaft 9 coaxial with the support shaft 12. This shaft 19 is passed through the orifice 15 in the arm 4₁ of the engine frame and connected to the end of the lever 17. By moving the lever 17 vertically as shown in FIGS. 1 and 4, the transmission roller 10 is displaced vertically in respect of the support point 6 of the engine frame 4 along the orifice 15, thus contacting with or moving away from the front wheel tire 11.

At the center of the level 17 is provided a semi-circular window 20 on the back of which is provided a crank 22 attached at its end by the support shaft 21 at the center of the window 20. The crank 22 has an orifice 23 at the center, which engages the shaft 24 which extends from the engine frame 4. A pin 24 provided at the end of the crank 22 extends through the said window 20 in such a way that the pin 24' turns along the periphery of the window 20. A spring 25 is connected to the pin 24 and the shaft 19 at the end of the said driving shaft 9.

Figure 5:
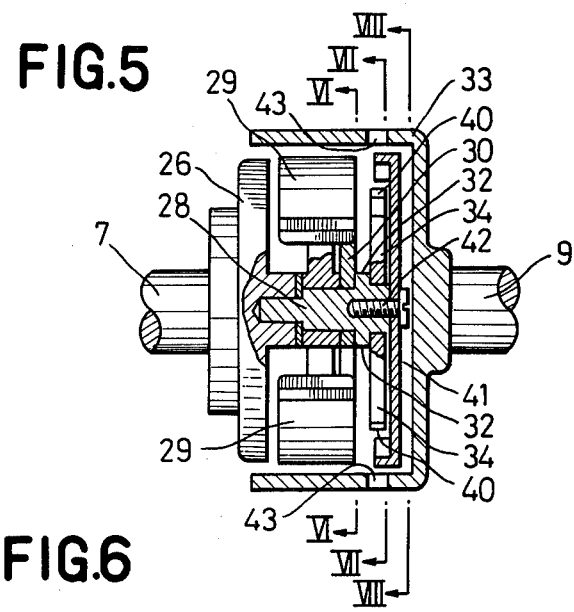
FIG. 5 is a vertical cross sectional view showing the clutch structure.
Figure 6:
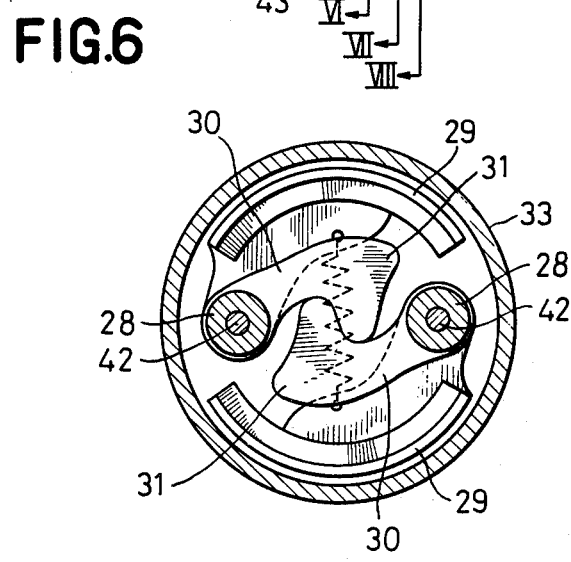
FIG. 6 is a vertical cross sectional view along the line VI—VI in FIG. 5.

The centrifugal clutch 8 to be arranged between the crank shaft 7 of the engine 1 and the driving shaft 9 has two support shafts 28 on the disc 26 provided at the end of the crank shaft 7 as shown in FIGS. 5 and 6. These support shafts 28 support clutch shoes 29 which are operated by the rotational centrifugal force. These support shafts 28 further pivotally support one pendulum 30 having a weight 31 at its end which assist the opening of the clutch shoes by the centrifugal force. These pendulums 30 stay inside the clutch shoes 29 assisted by the flanges 32 provided on the support shaft 28.

Figure 7:
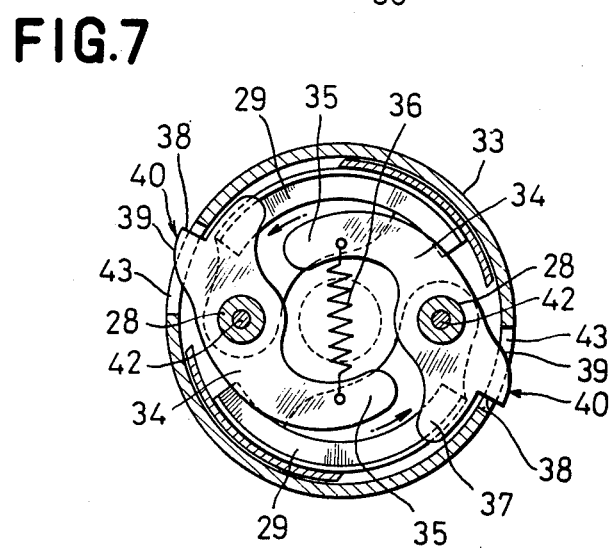
FIG. 7 is a vertical cross sectional view along the line VII—VII in FIG. 5.

As shown in FIG. 7, flanges 32 of the support shafts 28 have claw arms 34 pivotally and rotatably supported on the outside for engaging with clutch drums 33 provided on the driving shaft 9.

Claw arms 34 have curved rear ends 35 so that they will be housed within the clutch shoes 29 easily and the respective rear ends 35 are connected to each other by a spring 36. Outside the tip 37 of the claw arm 34 is formed a step-like portion 38 facing the said tip 37 and the claws 40 forming a gentle curved surface 39 on the back of the step 38 toward the rear end 35. The claw arms 34 are each pivotally supported by a support shaft 28 in such a fashion that the steps 38 of the claws 40 would face the rotational direction of the crank shaft 7 (counterclockwise direction in FIG. 7). The ends of the support shafts 28 are inserted respectively into covers 41 which are fixed to the end of the support shaft 28 with a bolt 42 as shown in FIG. 5.

As also shown in FIG. 5, on the crank shaft side of the driving shaft 9 is provided a clutch drum 33. This clutch drum 33 has two holes 43 to allow engagement of the claws 40 of the claw arms 34 as shown in FIG. 7.

The bicycle engine in accordance with the present invention is constructed as described above, and when starting the engine 1, the lever 17 for inclining the engine 1 is pulled up as shown in FIG. 4, thereby moving the transmission roller 10 downward to contact the front wheel tire 11. Then the front wheel tire 11 is revolved by pedaling. This will cause the front wheel rotation to be transmitted to the driving shaft 9 via the transmission roller 10 and the clutch drum 33 to turn.

Figure 8:
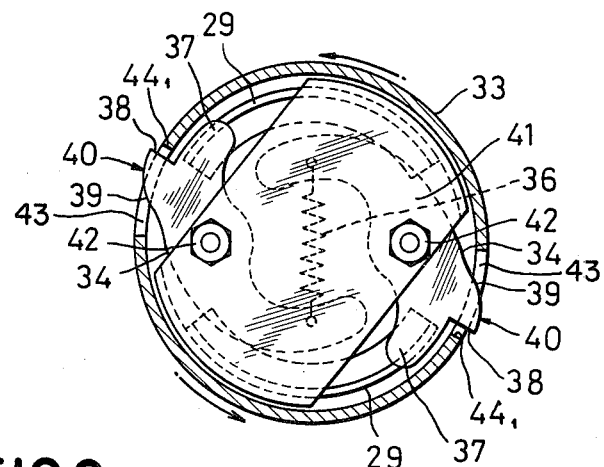
FIG. 8 is a vertical cross sectional view along the line VIII—VIII in FIG. 5.
Figure 9:
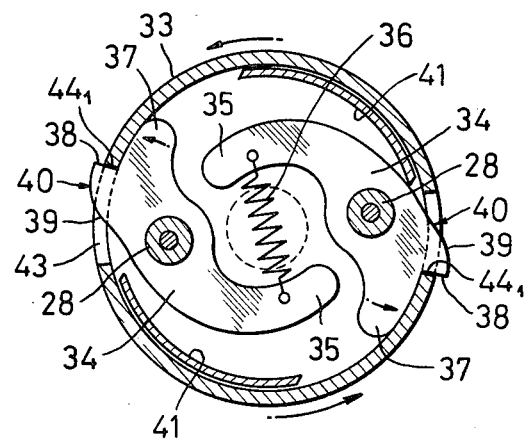
FIGS. 9 and 10 are cross sectional views showing how the claw arms shown in FIG. 7 operate.

As shown in FIG. 8, the clutch drum 33 turns counterclockwise until the holes 43 come into position over claws 40 of the claw arms 34 and the claw 40 jumps out of the hole 43 into clutch drum 33 as the claw arms 34 are pulled together by the spring 36 and one end of the hole 43 engages with the step 38 of the claw 40. As shown in FIG. 9, the ends 37 of the claw arms 34 respectively are pivotally supported by the support shaft 28, and the said ends 37 are pressed against the inner surface of the drum 33 to secure the engagement of the claw 40 with the hole 43. Thus, the rotation of the clutch drum 33 is transmitted to the crank shaft 7 on the side of the clutch shoe provided on the support shaft 28 and the engine is started.

Figure 10:
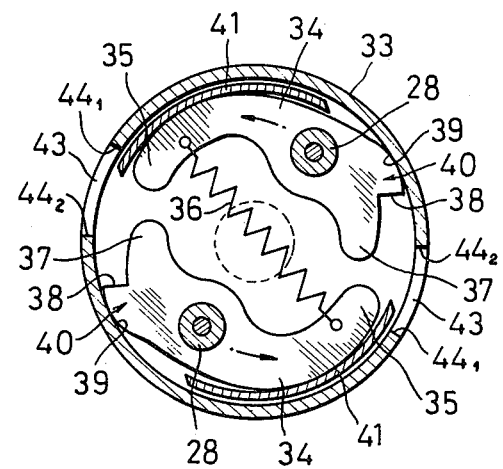

When making a temporary stop at an intersection after the bicycle has begun to be powered by the engine 1, the engine 1 is throttled back to reduce the rotational speed and the centrifugal force of the clutch shoes 29 reduce, as shown in FIG. 6, to separate the clutch shoes 29 from the clutch drum 33, thus cutting the transmission of the crank shaft rotation to the driving shaft 9. The bicycle may then be stopped even when the transmission roller 10 is in contact with the front wheel tire 11. Accordingly, there is no need to manually move the transmission roller 10 away from the front wheel tire 11 by the operating lever 17 of the engine. At this time, the claw arms 34 provided on the support shaft 28 of the clutch shoes 29 continue rotating within the clutch drum 33 since the crank shaft 7 has not ceased to rotate. In this state, the curved back 39 of the claw 40 of the claw arm 34 presses upon one end $44_2$ of the hole in the clutch drum 33, and the claw 40 retracts as shown in FIG. 10 allowing the crank shaft 7 to idle.

To restart the bicycle, one opens the throttle increasing the rotational speed of the crank shaft 7, thereby causing the centrifugal clutch shoes 29 to press upon the inner surface of the clutch drum 33 and transmit the engine rotation to the driving shaft 9. Sometimes the clutch shoes 29 keep sliding as they do not touch the inner surface of the clutch drum 33 before the engine rotation reaches the front tire 11 and the crank shaft 7 achieves sufficient rotational speed, although this continues only for a very short period of time. Then, the respective pendulum 30 provided on the support shaft 28 opens outwardly because of the centrifugal force along with the clutch shoes 29 and pushes the weight 31 at their end, thus complementing the pressure of the clutch shoes against the clutch drum 33 to immediately secure the close contact.

In the bicycle engine in accordance with the present invention, there is provided a centrifugal clutch mechanism between the engine 1 and the driving shaft 9 which can start the engine 1 by transmitting the rotation of the front wheel tire 11 and at the same time prevent the said transmission while the engine is kept idle. Thus, there is no need to manipulate the inclining lever 17 of the engine 1 every time the engine 1 is started or the bicycle is stopped. The lever 17 need only be used in emergencies as a safety measure.

What we claim is:

1. In an apparatus for powering a bicycle having a tire, comprising:
    an engine (1); means for mounting said engine to a bicycle; a drive shaft (9); a centrifugal clutch (8) coupling said drive shaft (9) to said engine; and a transmission roller (10) coupled to said drive shaft (9) for contacting a tire (11) of said bicycle for driving said tire;
    the improvement wherein said centrifugal clutch includes:
    a first clutch member coupled to said engine and a second clutch member coupled to said drive shaft, said first and second
    clutch members being engageable together to transmit rotation from said engine to said drive shaft;
    centrifugal means coupled to at least one of said first and second clutch members for engaging said first and second clutch members together responsive to rotation of the engine;
    at least one claw arm (34) pivotally coupled to at least one of said first and second clutch members, said at least one claw arm (34) having a claw (40) thereon on the forward or outer position thereof relative to said pivotal coupling; and
    means for selectively engaging said claw of said at least one claw arm with the other of said clutch members, said at least one claw arm (34) with said claw (40) thereon rotatably driving said other of said clutch members responsive to said drive shaft rotating faster than said engine.

2. The apparatus of claim 1 wherein said at least one claw arm (34) is pivotally coupled to one of said first and second clutch members via respective support shafts (28).

3. The apparatus of either of claims 1 or 2 comprising two of said claw arms pivotally coupled to one of said first and second clutch members.

4. The apparatus of claim 3 wherein said selective engaging means includes spring means (36) coupling said two claw arms together at the rear portions of said claw arms which are on the side of said pivotal coupling means opposite said forward portions of said claw arms.

5. The apparatus of claim 4 wherein said claw (40) of said claw arms (34) each comprises a gently curved surface (39) facing the direction of rotation of said drive shaft; and a step (38) facing the direction opposite the direction of rotation of said drive shaft, said step (38) being engageable with the other of said clutch members responsive to said drive shaft rotating faster than the engine; said spring means (36) retracting said rear portions of said claw arms inwardly toward the center of said clutch member, thereby forcing said forward or outer portion of said claw arms (34) against said other clutch member.

6. The apparatus of claim 5, wherein said claw arms are pivotally coupled to said first clutch member, and wherein said second clutch member coupled to said drive shaft has at least one elongated opening (43) into which said steps (38) of said claw arms may be forced through the action of said spring means by retracting said rear portions of said claw arms inwardly toward the center of said first clutch member, thereby allowing said step (38) to engage said first and second clutch members together and to impart the greater rotational speed of said drive shaft to said engine.

7. The apparatus of claim 5, wherein said gently curved surfaces (39) of said claw arms disengage said steps of said claw arms from said other clutch member responsive to engine rotational speed greater than drive shaft rotational speed.

8. The apparatus of claim 1, wherein said claw arms are pivotally coupled to said first clutch member and wherein said centrifugal clutch further comprises: at least one clutch shoe (29) pivotally attached to said first clutch member, such that engine rotation imparted to said first clutch member will centrifugally force said at least one clutch shoe against said second clutch member, thereby imparting engine rotation to said tire of said bicycle.

9. The apparatus of claim 8, wherein each of said at least one clutch shoe and at least one claw arm are pivotally attached by support shafts (28), each of said support shafts commonly supporting a clutch shoe and a claw arm.

10. The apparatus of claim 1, wherein said claw (40) of said claw arms (34) each comprises a gently curved surface (39) facing the direction of rotation of said drive shaft; and a step (38) facing the direction opposite the direction of rotation of said drive shaft, said step (38) being engageable with the other of said clutch members responsive to said drive shaft rotating faster than the engine; said spring means (36) retracting said rear portions of said claw arms inwardly toward the center of said clutch member, thereby forcing said forward or outer portion of said claw arms (34) against said other clutch member.

11. The apparatus of claim 1, further comprising means for selectively engaging said transmission roller with a front tire of said bicycle.

12. The apparatus of claim 11, wherein said means further comprises a lever means coupled to said engine for selectively inclining said engine to engage said transmission roller with said front tire.

* * * * *

UNITED STATES PATENT AND TRADEMARK OFFICE
CERTIFICATE OF CORRECTION

PATENT NO. : 4,172,504
DATED : October 30, 1979
INVENTOR(S) : Goro MUTO

It is certified that error appears in the above-identified patent and that said Letters Patent are hereby corrected as shown below:

COLUMN 1, line 22, change "move" to --to move--;

COLUMN 2, line 30, change "8" to --9--;

COLUMN 3, lines 37 and 38, change "claw 40 jumps out of" to

--claw 40 jumps into--;

line 60, change "by the operating lever 17" to

--by use of the operating lever--.

Signed and Sealed this

Eighteenth Day of March 1980

[SEAL]

Attest:

SIDNEY A. DIAMOND

Attesting Officer

Commissioner of Patents and Trademarks